(12) United States Patent
Tian et al.

(10) Patent No.: US 11,588,377 B2
(45) Date of Patent: Feb. 21, 2023

(54) ELECTRONIC DEVICES WITH A MOTOR THAT INCLUDES A STATOR WITH A NON-UNIFORM RADIUS OF CURVATURE

(71) Applicant: Apple Inc., Cupertino, CA (US)

(72) Inventors: Jifang Tian, Fremont, CA (US); Cheng Ping Tan, Fremont, CA (US); Enoch Mylabathula, San Jose, CA (US)

(73) Assignee: APPLE INC., Cupertino, CA (US)

( * ) Notice: Subject to any disclaimer, the term of this patent is extended or adjusted under 35 U.S.C. 154(b) by 250 days.

(21) Appl. No.: 16/791,971

(22) Filed: Feb. 14, 2020

(65) Prior Publication Data
US 2021/0257882 A1 Aug. 19, 2021

(51) Int. Cl.
*H02K 9/06* (2006.01)
*G06F 1/20* (2006.01)
*H02K 1/14* (2006.01)

(52) U.S. Cl.
CPC ............ *H02K 9/06* (2013.01); *G06F 1/20* (2013.01); *H02K 1/14* (2013.01); *H02K 1/148* (2013.01)

(58) Field of Classification Search
CPC ............ H02K 9/06; H02K 1/14; H02K 1/148; H02K 1/187; H02K 1/2786; H02K 2213/03; H02K 2201/03; G06F 1/20; G06F 1/203
USPC .................................. 310/216.074, 216.092
See application file for complete search history.

(56) References Cited

U.S. PATENT DOCUMENTS

| | | | |
|---|---|---|---|
| 3,601,513 A | 8/1971 | White, Jr. | |
| 4,139,335 A | 2/1979 | Wusthof et al. | |
| 6,623,260 B2 | 9/2003 | White | |
| 2004/0099404 A1* | 5/2004 | Cipolla | H01L 23/467 257/E23.099 |
| 2007/0098374 A1* | 5/2007 | Fujiwara | G06F 1/203 388/811 |
| 2010/0026126 A1* | 2/2010 | Han | H02K 1/2786 29/598 |
| 2011/0304238 A1* | 12/2011 | Nagai | G11B 19/2009 29/596 |

(Continued)

OTHER PUBLICATIONS

"The effect of winding arrangements on measurement accuracy of sinusoidal rotor resolver under fault conditions", F. Zare et al., ScienceDirect, Jan. 2019, 2 pages, URL: https://doi.org/10.1016/j.measurement.2018.08.074, downloaded Jan. 14, 2020.

*Primary Examiner* — Michael Andrews
(74) *Attorney, Agent, or Firm* — BakerHostetler

(57) ABSTRACT

A fan motor suitable for use in an electronic device, such as a consumer electronic device, is disclosed. The fan motor includes a stator and a rotor. In order to minimize a varying torque applied to the rotor, the stator includes modifications. For example, the stator includes stator teeth, each with an arc defined by a radius of curvature that varies. The radius (from a reference point to the arc) can vary in accordance with a sinusoidal curve. Furthermore, the corners of each stator tooth may be rounded. The rounded corners of the stator teeth may include a uniform (or constant, non-varying) radius of curvature. These enhancement are designed to provide a more uniform torque by the stator to the rotor. As a result, the rotation of the rotor is subject to smaller fluctuations, and the fan motor undergoes less vibration and generates less acoustical noise.

20 Claims, 12 Drawing Sheets

(56) References Cited

U.S. PATENT DOCUMENTS

| | | | | |
|---|---|---|---|---|
| 2013/0052061 A1* | 2/2013 | Li | ............... | F04D 25/0646 |
| | | | | 417/423.7 |
| 2015/0013147 A1* | 1/2015 | Zhang | ............... | H02K 29/03 |
| | | | | 29/596 |
| 2016/0301270 A1* | 10/2016 | Ota | ............... | H02K 1/08 |

* cited by examiner

ELECTRONIC DEVICES WITH A MOTOR THAT INCLUDES A STATOR WITH A NON-UNIFORM RADIUS OF CURVATURE

FIELD

The following description relates to fans that are used in electronic devices. In particular, the following description relates to electronic devices with a fan motor that includes a stator with stator teeth, with the stator teeth having an arc that follows a non-uniform radius of curvature. For instance, the radius of the stator teeth varies, and is proportional to the sine of the angle between a reference and a point on the arc. Additionally, the stator teeth may also include rounded corners. However, rounded corners include a uniform radius of curvature. The modifications to the stator teeth can result in smoother operation of the fan, including less vibration and less acoustical noise.

BACKGROUND

Fan motors include a stator and a rotor. The stator teeth (of the stator) are magnetized through a switching current, creating an electromagnetic field. The magnetic flux passing through the stator teeth interacts with a magnet, or magnets, on the rotor. The interaction generates torque on the rotor, causing the rotor to rotate, as well as fan blades connected to the rotor. The torque provided by the electromagnetic field changes as a result of the changing polarity of the electromagnetic field. The changing torque leads to "torque ripple," which causes vibration of the fan motor itself, or components near the fan motor. As a result of the vibration, the fan motor can act as a source of unwanted noise. When the fan motor is installed in an electronic device, the noise can be heard by a user of the electronic device.

Further, the stator and the rotor are ideally positioned in a concentric manner during the assembly of the fan motor. However, it is likely that at least some misalignment exists between the respective centers of the stator and the rotor. As a result, the distance, or gap, between the stator and the rotor is not uniform/consistent. This can also lead to vibration, resulting in acoustical noise.

SUMMARY

In one aspect, an electronic device is described. The electronic device may include a housing that defines an interior volume. The electronic device may further include a fan motor located in the interior volume. The fan motor may include a stator that includes a stator tooth having an arc defined by a varying radius of curvature that is proportional to a sinusoidal curve.

In another aspect, an electronic device is described. The electronic device may include a housing that defines an interior volume. The electronic device may further include a fan assembly located in the interior volume. The fan assembly may include fan blades. The fan assembly may further include a fan motor. The fan motor may include a stator comprising a stator tooth having an arc defined by a varying radius of curvature. The fan motor may further include a rotor. The fan blades can be are configured to rotate in accordance with the rotor. The fan motor may further include a magnet carried by the rotor. In some embodiments, a separation between the stator tooth and the magnet varies based upon the varying radius of curvature.

In another aspect, a method for reducing magnetic flux through a stator of a fan motor for an electronic device is described. The method may include shaping a stator tooth of the stator such that the stator tooth includes an arc defined by a varying radius of curvature. The method may further include rounding a corner of the stator tooth such the corner includes a uniform radius of curvature. The method may further include positioning a rotor over the stator. The rotor may include a magnet that faces the stator.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
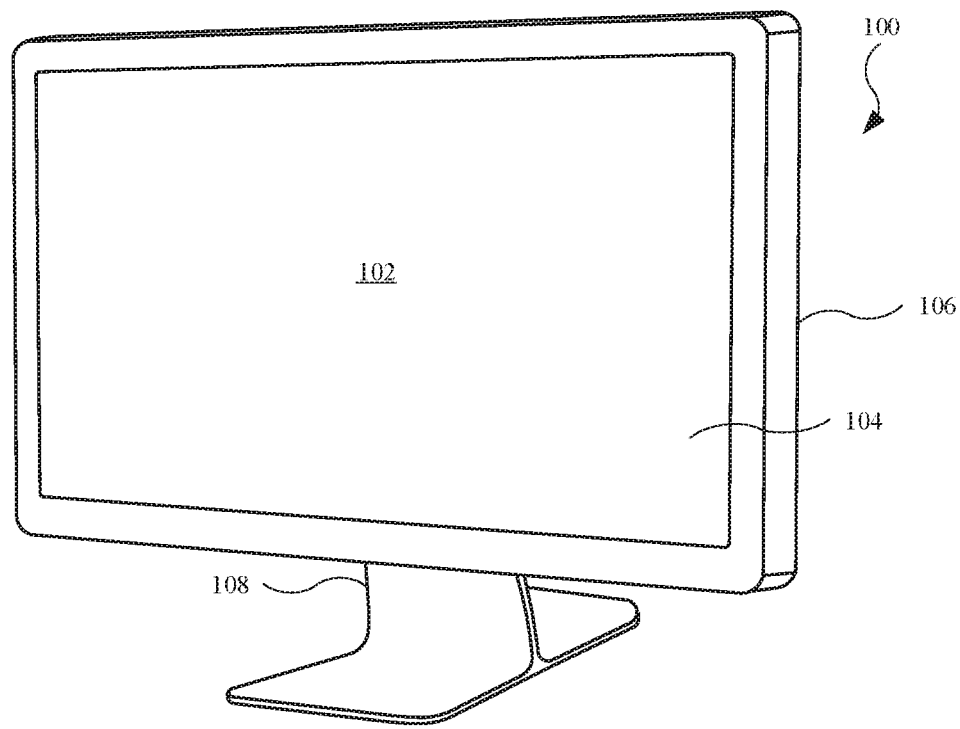
FIG. 1 illustrates an isometric front view of an embodiment of an electronic device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to fan assemblies for consumer electronic devices, such as desktop computing devices (with or without a display) and laptop computing devices. Specifically, this disclosure discusses modifications and enhancements to a stator used in fan motors of assemblies. Fan motors may include direct current ("DC") motors, including 3-phase DC brushless motors, as a non-limiting example. The magnetic flux through the stator, generated by a switching electrical current, generates torque used rotationally drive a rotor and fan blades connected to the rotor. Due the switching polarity of the electromagnetic field, torque ripple, associated with a changing output torque, leads to unbalances forces in the fan motor. In some instances, the unbalances forces causes the fan motor to vibrate, which can lead to acoustical noise. However, the modifications to the stator may result in reduced torque ripple. As a result, the torque profile is relatively uniform and the fan motor can run more smoothly, causing fewer vibrations and associated acoustical noise. In addition to torque ripple, the manufacturing tolerances of the stator and/or rotor can lead to eccentric, or non-concentric, assembly of the stator with the rotor, which can also lead to unbalanced forces and unwanted wanted vibrations and noise. The design modifications to the stator can also address issues related to eccentricity of the stator and the rotor.

In the described embodiments, the stator may include several stator teeth, each with modifications. For example, a stator tooth described herein is defined by an arc that can be shaped such that the arc includes a varying, or non-uniform, radius of curvature. In other words, the radius extending from a reference point to the arc changes based upon the selected point on the arc, as opposed to traditional a stator tooth with an arc defined by a constant radius of curvature. In some exemplary embodiments, the radius of curvature is proportional to a sinusoidal curve. In this regard, the radius is proportional to the sine of the angle between a reference point and line defined the radius. As a result, the separation between the stator teeth and the rotor (and in particular, between the stator teeth and the magnet(s) of the rotor) also varies. The resultant varying separation can reduce the magnetic interaction (creating the torque to drive the rotor) between the stator and the magnet of the rotor, which can reduce the torque ripple.

The stator teeth described herein may undergo further modifications. For instance, the stator teeth may include rounded corners, as opposed to traditional stator teeth with corners defined by an intersection between two straight/linear edges. In some exemplary embodiments, the rounded corners are defined by a uniform radius of curvature, in which the radius does not change at the rounded corners. As a result, the magnetic flux density through the stator teeth at or near the corners of the stator teeth is reduced, which can also contribute to reduced torque ripple. In addition to torque ripple minimization, the modifications to the stator can also minimize sensitivity issues related to eccentricity of the stator relative to the rotor, and vice versa.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 illustrates an isometric front view of an embodiment of an electronic device 100. In some embodiments, the electronic device 100 is a desktop computing device for consumers and other end users, capable of executing instructions through one or more processing circuits. While some embodiments may not include a display, in the embodiment shown in FIG. 1, the electronic device 100 includes a display 102. In some embodiments, the display 102 includes touch input (including capacitive touch input) display capabilities. The display 102 may include a liquid crystal display ("LCD"), a light emitting diode ("LED") display, or an organic light emitting diode ("OLED") display, as non-limiting examples. As shown, the display 102 is covered and protected by a transparent layer 104, which may include glass, plastic, or sapphire, as non-limiting examples.

Also, the electronic device 100 may include a housing 106, or enclosure, that provides an interior volume, or space, for various components, such as processor circuits, memory circuits, batteries, microphones, audio speakers, flexible circuitry, as non-limiting examples. The electronic device 100 may further include a stand 108 that supports the housing 106, and further allows rotational movement of the housing 106 (and the display 102) relative to the stand 108. The housing 106 and the stand 108 may include materials such as metal (such as aluminum, aluminum alloys, stainless steel), plastic, or ceramic, as non-limiting examples.

Figure 2:
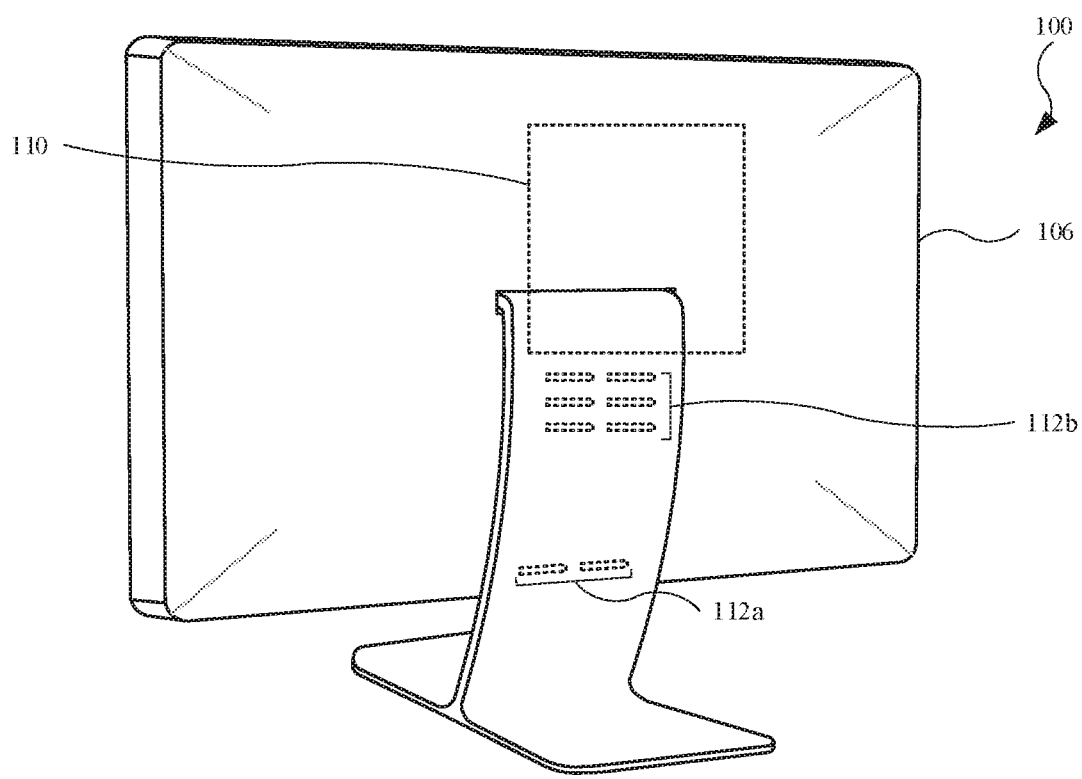
FIG. 2 illustrates an isometric rear view of the electronic device shown in FIG. 1.

FIG. 2 illustrates a rear isometric view of the electronic device shown in FIG. 1. As shown, the electronic device 100 includes a fan assembly 110 positioned in the internal volume of the housing 106. The fan assembly 110 is designed to cool heat-generating components (not shown in FIG. 2) positioned in the internal volume of the housing 106. The housing 106 may include openings 112a, or through holes, used as air inlet vents allowing to enter and circulate within the housing 106. During operation of the electronic device 100, the heat-generating components undergoes a temperature increase and heat the surrounding air within the internal volume. In order to remove at least some of the heated air, the electronic device 100 may activate the fan assembly 110, which directs the heated air away from the heat-generating components and toward openings 112b formed in the housing 106.

Figure 3:
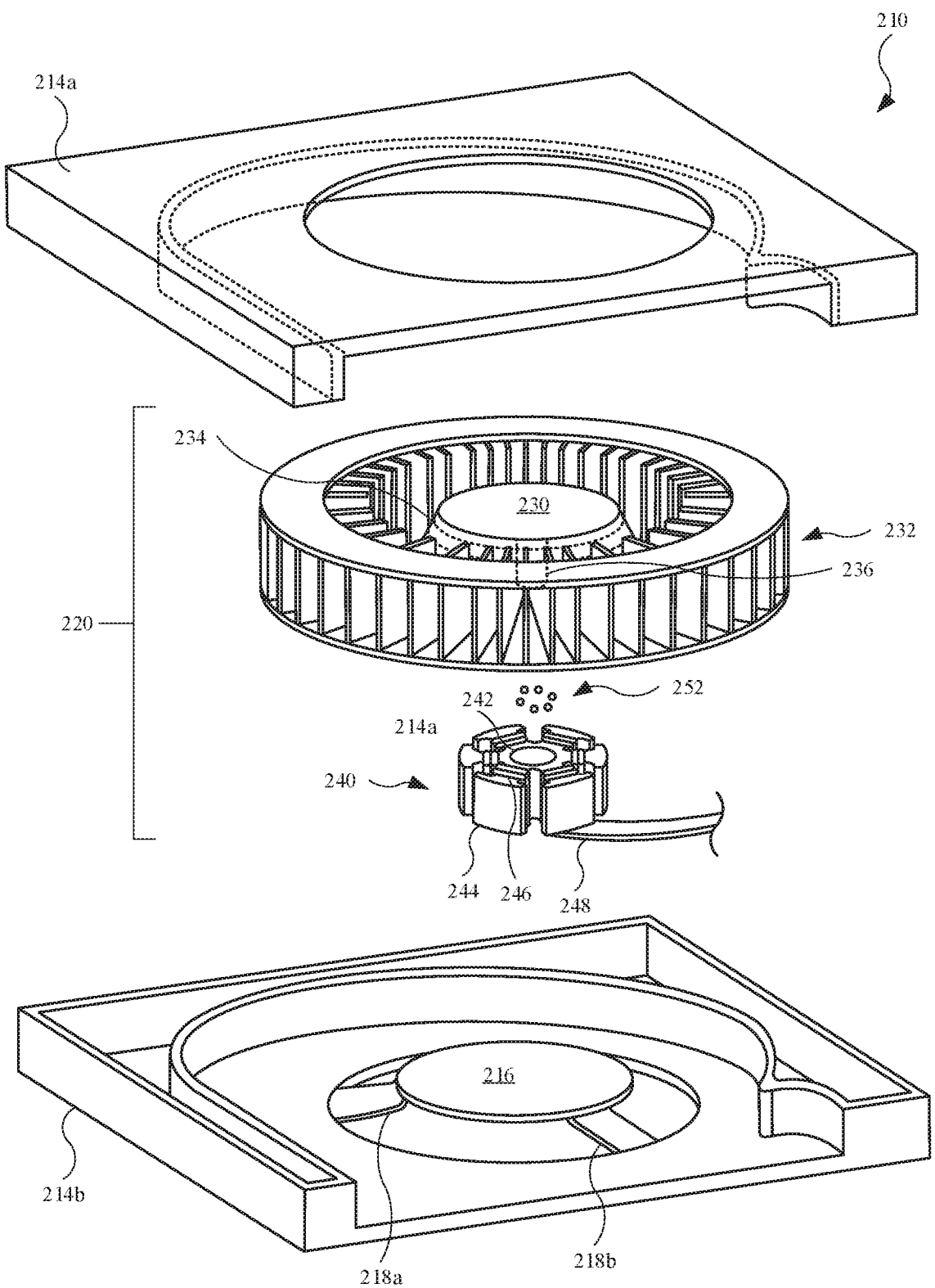
FIG. 3 illustrates an exploded view of an embodiment of a fan assembly.

FIG. 3 illustrates an exploded view of an embodiment of a fan assembly 210. The fan assembly 110 (shown in FIG. 2) may include any features described herein for the fan assembly 210. Also, the fan assembly 210 shown and described herein may be integrated into any electronic device shown and/or described herein. As shown, the fan assembly 210 includes a housing part 214a and a housing part 214b. Generally, the housing part 214a and the housing part 214b combine to define an enclosure for the components of the fan assembly 210. The housing part 214b includes a platform 216 connected by several structures, such as a strut 218a and a strut 218b. Although not shown, an additional strut may be present.

The fan assembly 210 may further include a fan motor 220 that can be positioned on the platform 216. The fan motor 220 may include a DC motor, including a 3-phase DC brushless motor. The fan motor 220 may include a rotor 230 and a stator 240. As shown, the rotor 230 is connected to fan blades 232. The rotor 230 may also include a magnet 234. The magnet 234 (shown as dotted lines) may represent several magnets. The rotor 230 also includes a shaft 236. The stator 240 includes an opening 242 that receives the shaft 236. The stator 240 may include several stator teeth, with each stator tooth having wire that forms a coil when wrapped around the stator tooth. As shown, the stator 240 includes a stator tooth 244 and a coil 246 wrapped around the stator tooth 244. The stator tooth 244 and the coil 246 are representative of additional stator teeth and coils, respectively.

As shown, a flexible circuit 248 is electrically coupled to the coils. From an external power source (not shown in FIG. 3), the flexible circuit 248 can provide an electrical current, including a switching electrical current, to the coils. In this regard, the coils are designed to form an electromagnet under the influence of the switching electrical current. The switching electrical current changes the magnetic polarity, and ideally produces a changing magnetic field in accordance with a sinusoidal curve. Accordingly, based on the changing magnetic polarity, the stator can provide a rotational force, or torque, through magnetic attraction and repulsion with the magnet 234 of the rotor 230. Also, in order to promote rotational movement, the fan motor 220 may further include bearings 252 that engage the shaft 236 and the stator 240.

Figure 4:
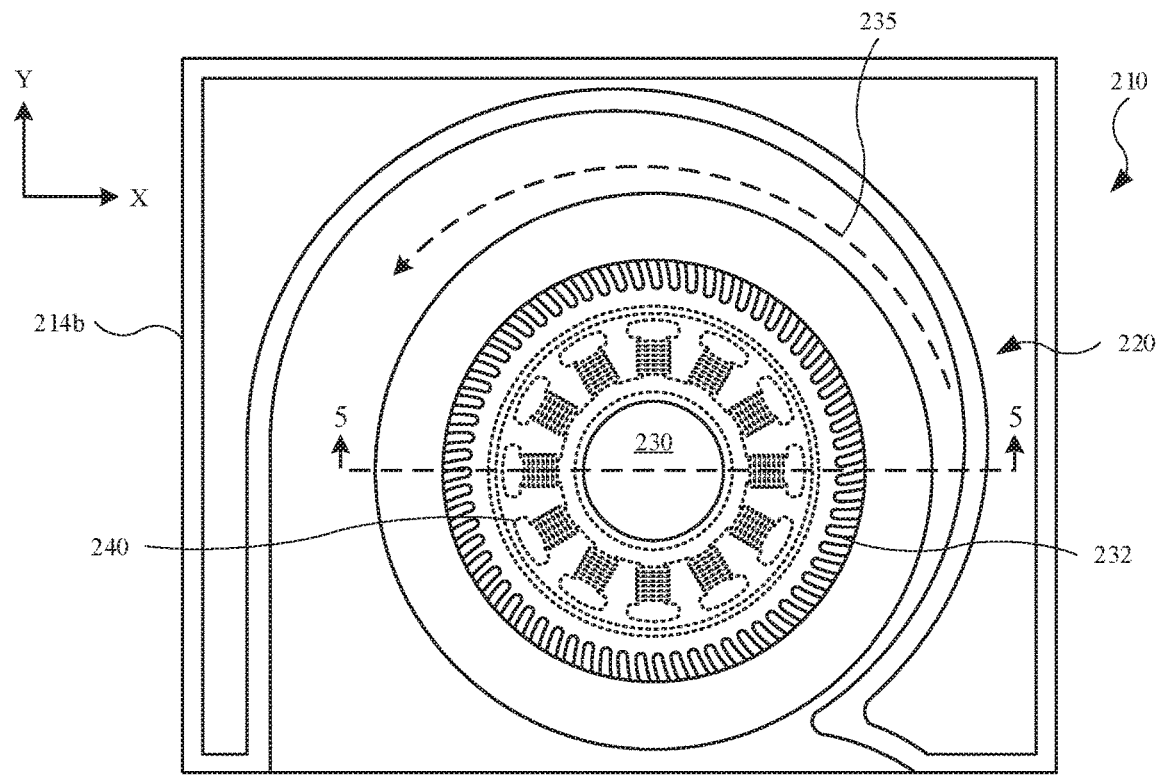
FIG. 4 illustrates a plan view of the fan assembly shown in FIG. 3.

FIG. 4 illustrates a plan view of the fan assembly 210 shown in FIG. 3. For purposes of illustration, only the housing part 214b is shown and the housing part 214a (shown in FIG. 3) is removed. As shown, the stator 240 is covered by the rotor 230. During operation of the fan assembly 210, the torque provided by the stator 240 to the rotor 230 causes the rotor 230 and the fan blades 232 to rotate in the direction of the arrow 235. Ideally, the force, $F_x$, along the X-axis and the force, $F_y$, along the Y-axis are balanced/cancelled such that $$\Sigma F_x = 0 \quad (1)$$

and $$\Sigma F_y = 0. \quad (2)$$

When the summation of the forces are balanced, the rotor 230 generally tends to rotate on a stationary axis and little, if any, vibration of the fan motor 220 occurs. However, due in part to the switching electrical current (and resultant changing magnetic polarity), torque ripple occurs. The torque ripple exerted on the rotor 230 during operation is not uniform. As a result, the torque ripple causes a changing acceleration, and thus, non-uniformity of the rotational velocity of the rotor 230 and the fan blades 232, and summation of the forces in the X- and Y-axes are no longer equal to zero. This can cause the fan motor 220 (or other nearby structures) to wobble, causing unwanted vibration of the fan motor 220, the fan assembly 210, and/or other structures in an electronic device (not shown in FIG. 4) that are adjacent to the fan assembly 210. The unwanted vibration can lead to acoustical noise.

Figure 5:
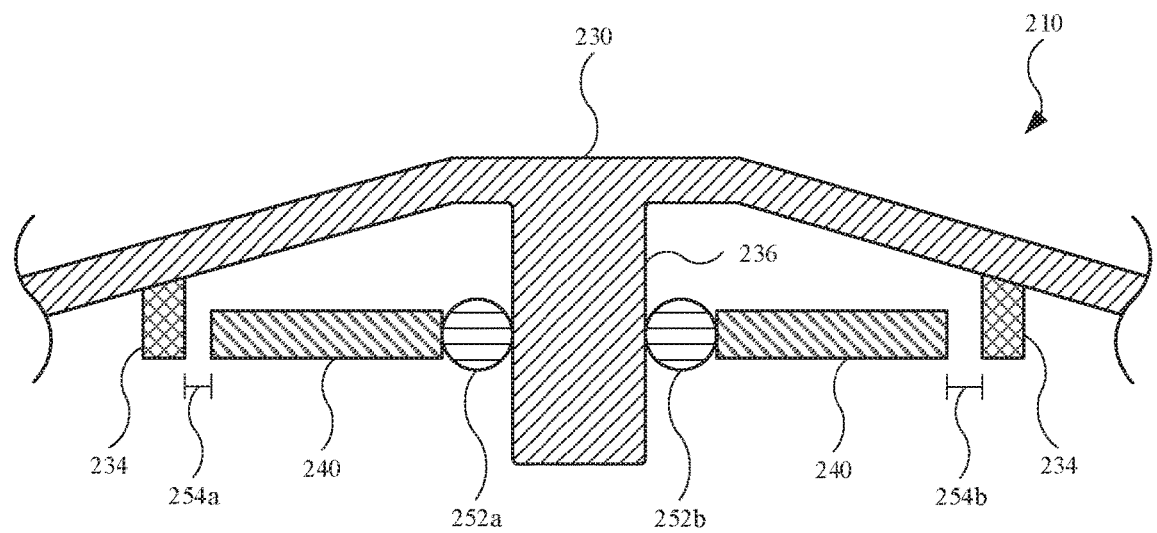
FIG. 5 illustrates a cross sectional view of the fan assembly shown in FIG. 4, taken along line 5-5.

Additional structural issues can also lead to unwanted vibration and acoustical noise. For example, FIG. 5 illustrates a cross sectional view of the fan assembly 210 shown in FIG. 4, taken along line 5-5. As shown, the stator 240 is separated from the shaft 236 by a bearing 252a and a bearing 252b. Also, at one location, the stator 240 is separated from the magnet 234 by a separation 254a, or gap, and at another location, the stator 240 is separated from the magnet 234 by a separation 254b, or gap, that is different from the separation 254a. This may due in part to assembly issues and/or manufactures tolerances of any (or all) of the aforementioned components. As a result of the difference in the separation, the summation of the forces in the X- and Y-axes (shown in FIG. 4) acting on the rotor 230 may not equal zero. This can also lead to additional wobbling of the rotor 230, causing additional vibration within the fan assembly 210, and additional unwanted acoustical noise.

FIGS. 6-9 show and described modifications to a stator of a fan motor. The modifications are designed to minimize issues associated with torque ripple. For instance, the modifications shown and described in FIGS. 6-9 may reduce torque ripple, leading to less vibration and acoustical noise.

Figure 6:
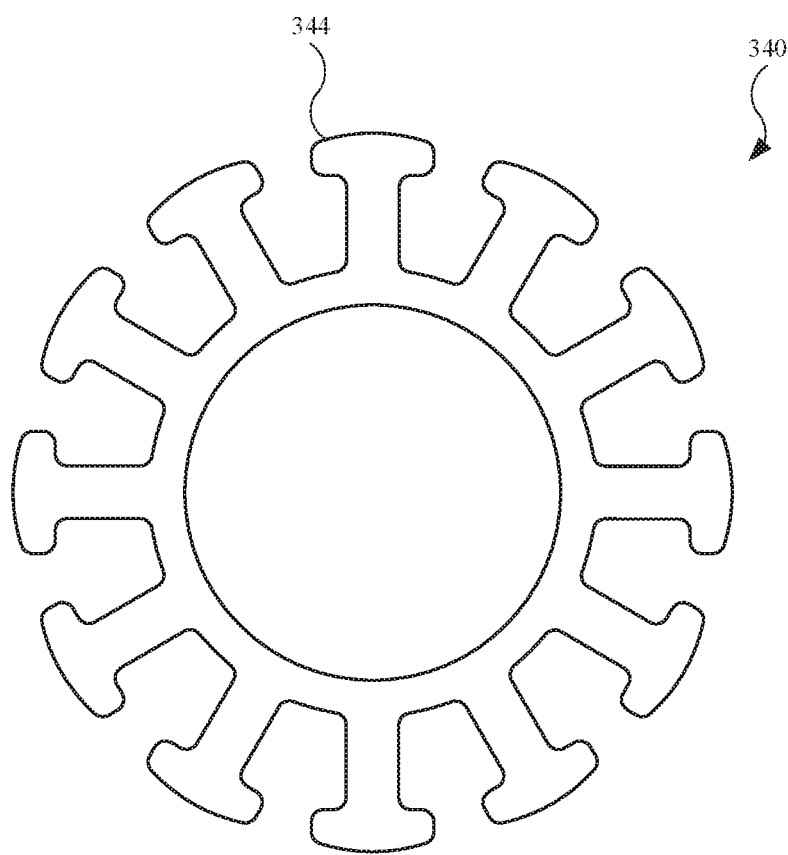
FIG. 6 illustrates a plan view of an embodiment of a stator.

FIG. 6 illustrates a plan view of an embodiment of a stator 340. The stator 340 may be integrated into any fan motor described herein. Also, the stator 340 may include materials such as steel, as a non-limiting example. As shown, the stator 340 includes several stator teeth, including a stator tooth 344 representative of additional stator teeth. The stator 340 includes 12 stator teeth. However, the number of stator teeth may vary in other embodiments.

Figure 7:
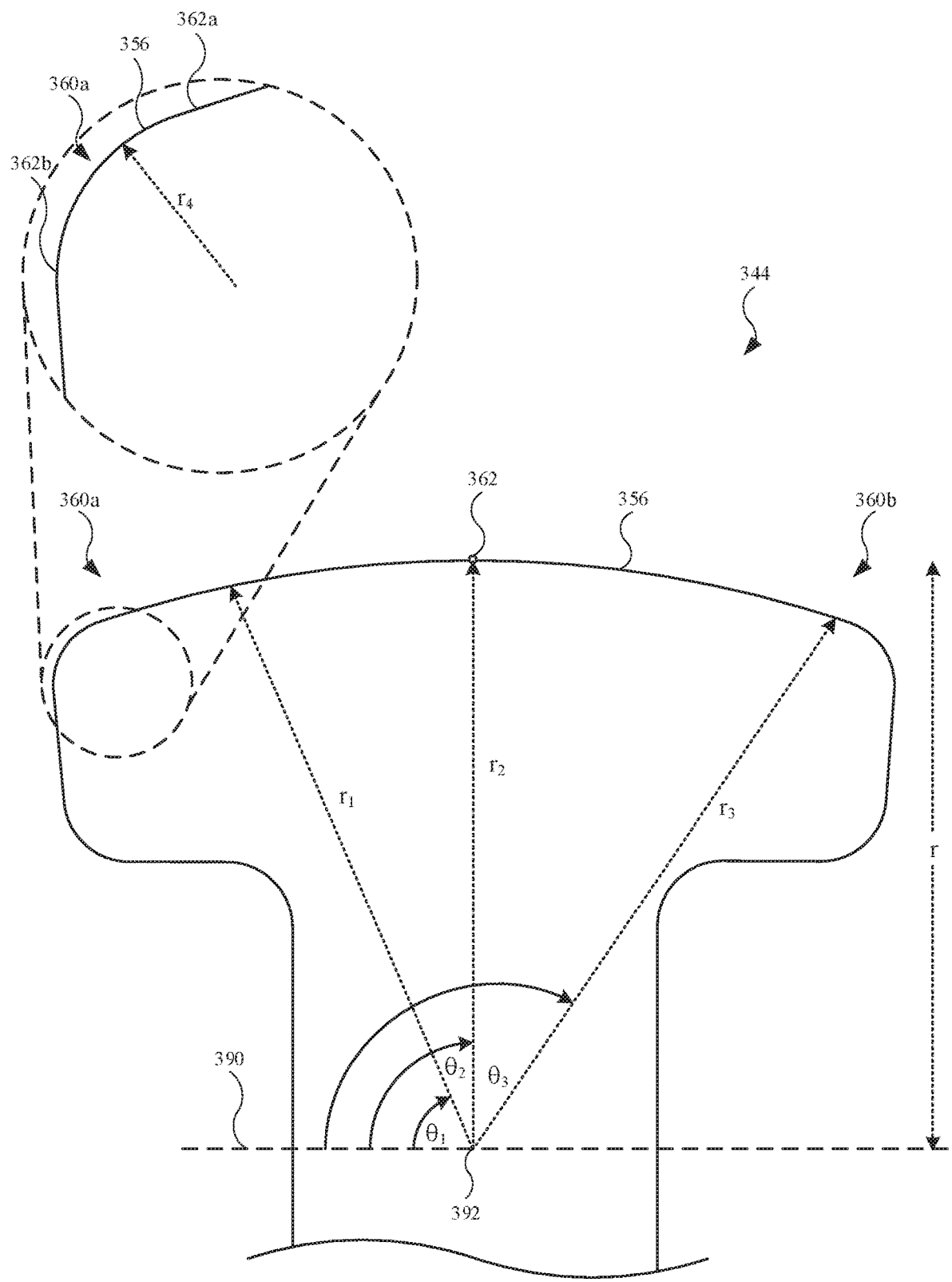
FIG. 7 illustrates an enlarged view of the stator tooth of the stator shown in FIG. 6, showing additional features of the stator tooth.

FIG. 7 illustrates an enlarged view of the stator tooth 344 of the stator 340 shown in FIG. 6, showing additional features of the stator tooth 344. As shown, the stator tooth 344 includes an arc 356. In traditional stators, the arc of the stator tooth includes a uniform radius of curvature, and the radius from a reference point at any point on the arc is constant. However, the arc 356 of the stator tooth 344 includes a varying, or non-uniform, radius of curvature, in which the radius from a reference point to the arc changes. For instance, a reference radius r is shown extending from a reference line 390 to a midpoint 362 of the arc 356 of the stator tooth 344. The is radius can change at different locations along the arc 356. For instance, a radius $r_1$ extending from a reference point 392 on the reference line 390 to the arc 356, and at an angle $\theta_1$ relative to the reference line 390 has a dimension $$r_1 = r \sin \theta_1. \quad (3)$$

Further, a radius $r_2$ extending from the reference point 392 on the reference line 390 to the arc 356, and at an angle $\theta_2$ (different from the angle $\theta_1$) relative to the reference line 390, has a dimension $$r_2 = r \sin \theta_2. \quad (4)$$

Additionally, a radius $r_3$ extending from the reference point 392 on the reference line 390 to the arc 356, and at an angle $\theta_3$ (different from the angle $\theta_1$ and the angle $\theta_2$) relative to the reference line 390, has a dimension $$r_3 = r \sin \theta_3. \quad (5)$$

Accordingly, the radius from the reference point 392 to the arc 356 varies and is proportional to an angle $\theta$. The radii $r_1$, $r_2$, and $r_3$ are exemplary radii, and it should be understood that several other radii with a length/dimension different than radii $r_1$, $r_2$, and $r_3$ are possible for a different angle $\theta$. Further, based on the sinusoidal curve being symmetrical for a half-period, the arc 356 may be a symmetrical arc while also having a varying radius of curvature. Referring again to the radius $r_2$, the radius $r_2$ extends from the reference point 392 on the reference line 390 to the midpoint 362 on the arc 356. Based upon the location of the midpoint 362 and the reference point 392, the angle $\theta_2$ equals 90 degrees. Thus, using Equation (4), the radius $r_2$ is equal to r. Furthermore, because $-1 \leq \sin \theta \leq 1$, the radius $r_2$ at the midpoint 362 represents the maximum radius, or radius of greatest length.

While the arc 356 is defined by a varying radius of curvature, other regions along the arc 356 may be defined by a different formula for the radius of curvature. For instance, the corners, such as a corner 360a and a corner 360b, of the stator tooth 344 are defined by a uniform radius of curvature. For example, as shown in the enlarged view, the corner 360a includes a radius of curvature defined by a radius $r_4$ that remains constant from a first point 362a (defined by a transition from the varying radius of curvature along the arc 356) to a second point 362b. The corner 360b may include any features described herein for the corner 360a. For instance, the corner 360b can include a radius of curvature defined by the radius $r_4$ such that the corners are identical, or at least substantially similar, to each other. Accordingly, the corner 360a and the corner 360b may each be referred to as a rounded corner, as the corner 360a and the corner 360b are not defined by an intersection of two straight/linear edges. Also, the corner 360a and the corner 360b may be referred to as a first rounded corner and a second rounded corner, respectively.

Figure 8:
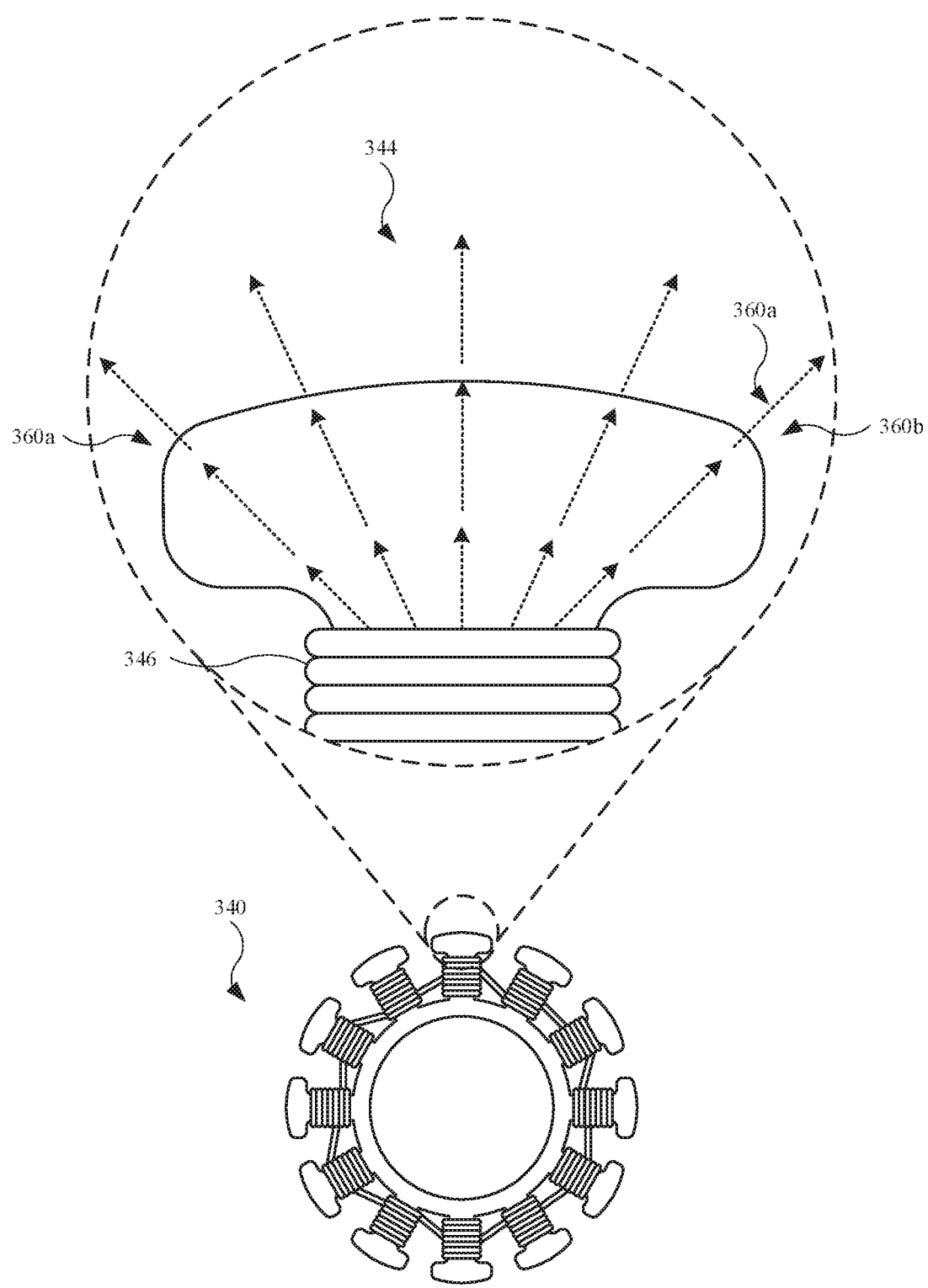
FIG. 8 illustrates a plan view of the stator shown in FIGS. 6 and 7, with several windings around the stator teeth.

FIG. 8 illustrates a plan view of the stator 340 shown in FIGS. 6 and 7, with several windings around the stator teeth. As shown in the enlarged view, a coil 346 is wrapped around the stator tooth 344. Further, electrical current passes through the coil 346, thereby generating an electromagnetic field (represented by dotted lines) through the stator tooth 344. The electromagnetic field is representative, and intended to be an approximation. Based upon the corner 360a and the corner 360b each being rounded corners, the magnetic flux concentration through each of the corner 360a and the corner 360b is reduced. Also, during operation of a fan motor (not shown in FIG. 8) that integrates the stator 340, the electrical current through the coil 346 changes, causes a change in the magnetic polarity of the resultant electromagnet. The rounded configuration of the corner 360a and the corner 360b may assist in a more gradual change in the electromagnetic field as experienced by a magnet on a rotor (not shown in FIG. 8), as compared to a sharper, immediate transition in the electromagnetic field provided by traditional stators.

Figure 9:
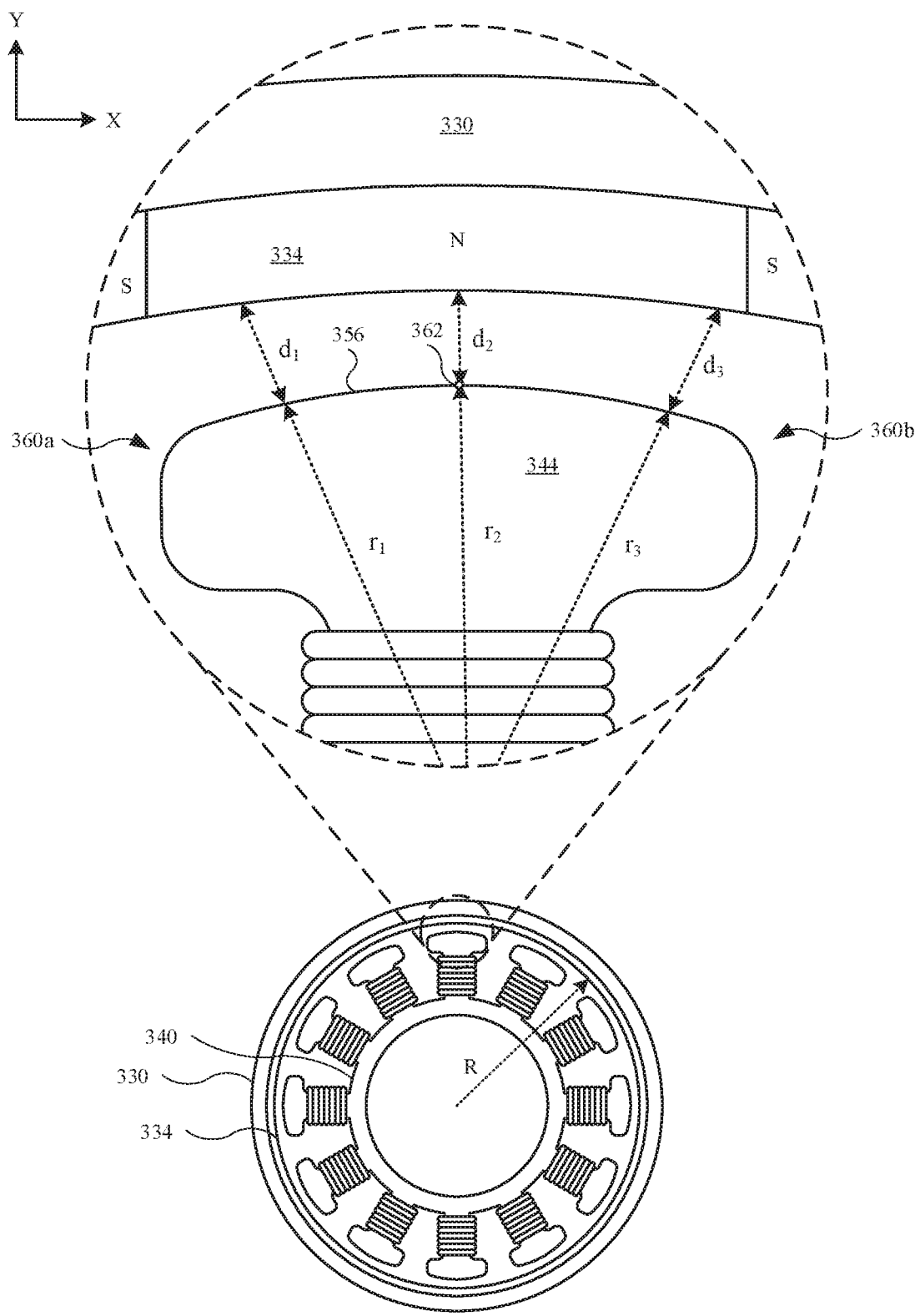
FIG. 9 illustrates a plan view of the stator shown in FIG. 8, further showing a rotor surrounding the stator.

FIG. 9 illustrates a plan view of the stator 340 shown in FIG. 8, further showing a rotor 330 and a magnet 334 surrounding the stator 340. For purposes of simplicity, fan blades are not shown. However, the fan blades may be connected to the rotor. Based upon the varying radius of curvature of the arc 356 of the stator tooth 344, the separation between the magnet 334 and the stator tooth 344 also varies. For example, the radius R (a constant radius) is measured from the center point of the stator 340 to an inner surface (defined by the inner diameter) of the magnet 334. The distances $d_1$, $d_2$, and $d_3$ represent the shortest distance between the magnet 334 and the stator tooth 344 at respective location along the arc 356. Further, the distances $d_1$, $d_2$, and $d_3$ represent the difference between the magnet 334 and the stator tooth 344 at a location corresponding to radii $r_1$, $r_2$, and $r_3$, respectively (see also, FIG. 7, for reference). Accordingly, the distances $d_1$, $d_2$, and $d_3$ can be found by the following equations:

$$d_1 = R - r_1 \tag{6}$$

$$d_2 = R - r_2 \tag{7}$$

$$d_3 = R - r_3. \tag{8}$$

Based on their different respective locations/positions along the arc 356, each of the distances $d_1$, $d_2$, and $d_3$ is different from the other. Also, recall (from FIG. 7) the angle $\theta_2$ between the reference line 390 and the radius $r_2$ equals 90 degrees. Thus, using Equation (7), the radius $d_2$ represents the shortest distance between the magnet 334 and the stator tooth 344.

By example, FIG. 9 shows that the distance between the magnet 334 and the stator tooth 344 varies due to the varying radius of curvature of the arc 356. This may include a varying separation proportional to a sinusoidal curve, as the radius of the arc 356 is proportion to a sinusoidal curve. As a result, the influence by the magnetic flux through the stator tooth 344 on the magnet 334 varies, as some locations of the arc 356 are further form the magnet 334 than other locations of the arc 356. Further, when the magnetic field switches polarity, the overall influence by the changing magnetic flux through the stator tooth 344 on the magnet 334 reduces. Moreover, due to rounded configuration, less magnetic flux passes through the corner 360a and the corner 360b. Thus, the design modifications of the stator tooth 344, through the non-uniform arc and the uniform corners, can reduce torque ripple. Accordingly, a fan motor (not shown in FIG. 9) that integrates the stator 340 may run more smoothly with less vibration and associated acoustical noise.

Figure 10:
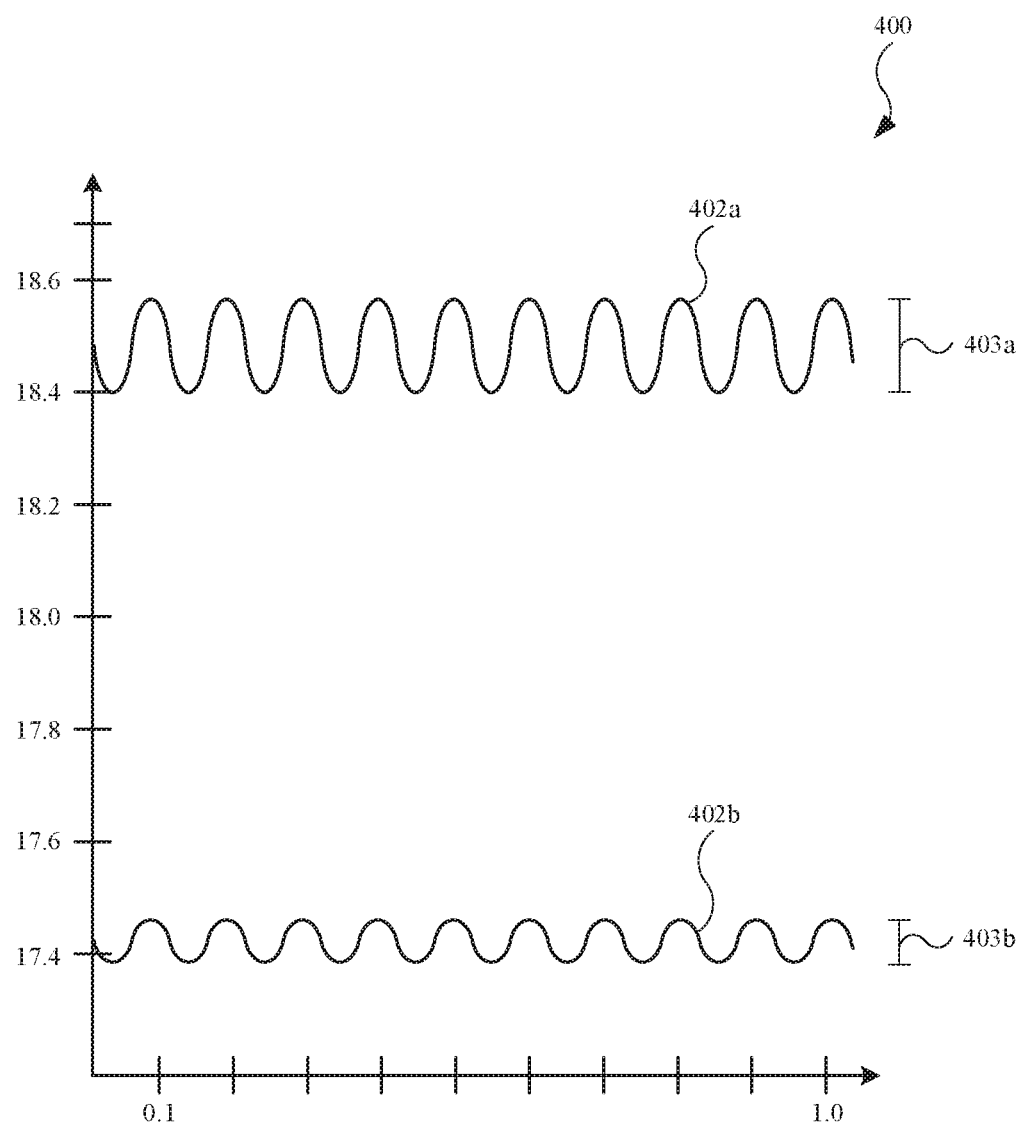
FIG. 10 illustrates a chart that plots torque vs time for a traditional fan motor and a motor incorporating stators disclosed herein.

FIG. 10 illustrates a chart 400 that plots torque vs time. The torque (in mN*m/A) is measured over 1 period. The plot 402a and the plot 402b measure torque for traditional fan motor and a fan motor incorporating modified stators disclosed herein, respectively. The equation for the torque can be determined by $$T = I * kT \tag{9}$$

where I is the current through the coil and $k_T$ is a torque constant of the motor.

When comparing the plot, it can be seen that the torque ripple, measured from the valley to the peak of a plot, is greater for motors using traditional stators as compared to motors using the stators described herein. For instance, the plot 402a shows torque ripple 403a of approximately 0.18 mN*m/A while the plot 402b shows torque ripple 403b of approximately 0.8 mN*m/A. Thus, the torque ripple from a fan motor using the modified stator is less than that of a fan motor using a traditional stator. When the torque ripple reduces, the fan motor runs more smoothly and undergoes less vibration, which can lead to less acoustical noise.

Additional testing and experimentation shows that the stator modification can minimize the sensitivity issues related to eccentricity of the stator relative to the rotor, and vice versa. For example, for some harmonic numbers, a 10 dB noise improvement can be achieved even when the stator is eccentric with respect to the rotor. Conversely, for some given harmonic numbers, a 15 dB noise improvement can be achieved even when the rotor is eccentric with respect to the stator.

Figure 11A:
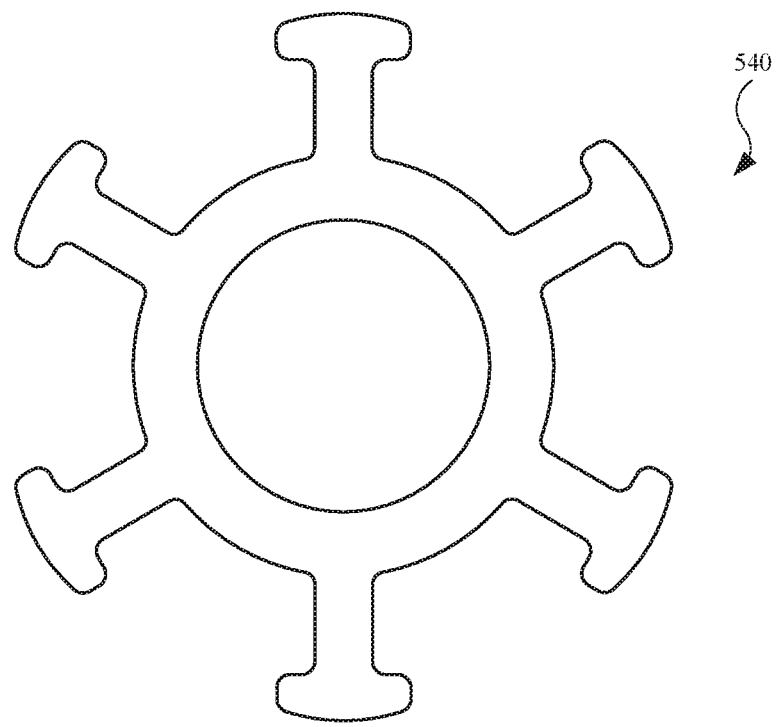
FIGS. 11A-11B illustrates plan views of alternate embodiments of a stator.
Figure 11B:
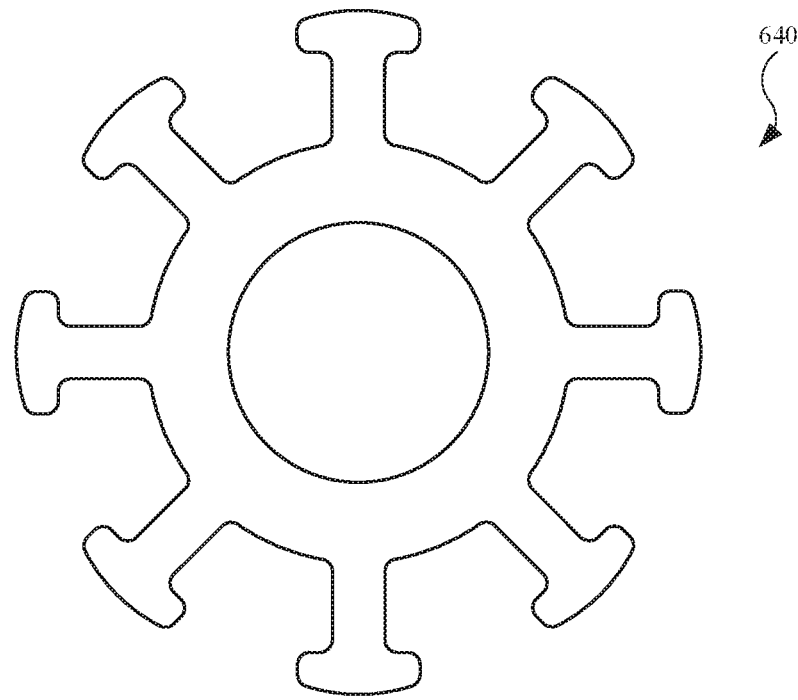

While a specific number of stator teeth was shown for the stator 240 (in FIG. 3) and the stator 340 (in FIG. 7), the number of stator teeth may vary. For example, FIGS. 11A-11B illustrates plan views of alternate embodiments of a stator. FIG. 11A illustrates a stator 540 with 6 stator teeth, and FIG. 11B shows a stator 640 with 8 stator teeth. Thus, the number of stator teeth shown and described herein can vary. Further, the number of stator teeth shown and described herein should not be construed as limiting.

Figure 12:
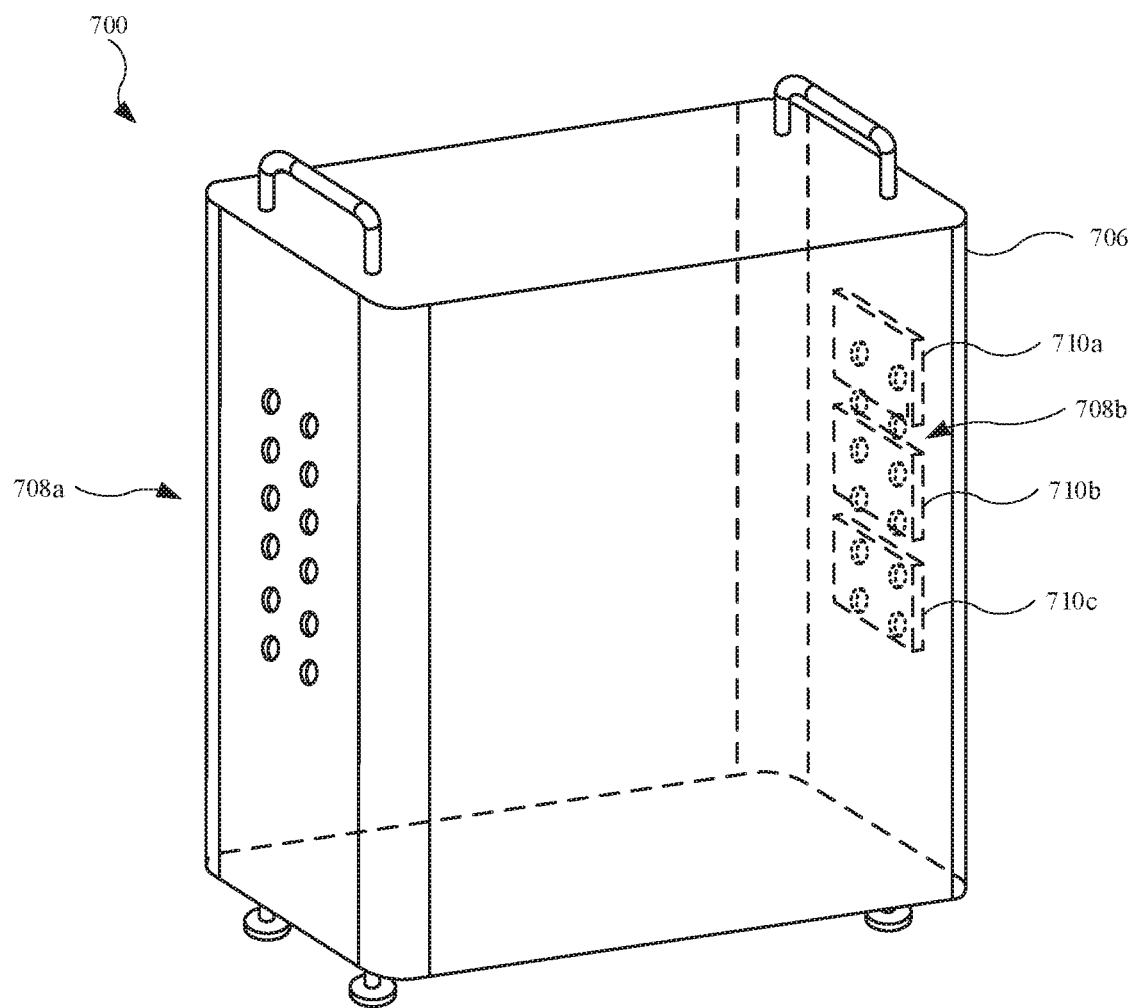
FIG. 12 illustrates an isometric view of an alternate embodiment of an electronic device.

FIG. 12 illustrates an isometric view of an alternate embodiment of an electronic device 700. As shown, the electronic device 700 may include a desktop, or "tower," computing device designed for use with a display and other accessories (not shown in FIG. 12), such as a display/monitor, a mouse, and/or a keyboard. The electronic device 700 includes a housing 706, or enclosure, that defines an internal volume that can carry several internal components including, as non-limiting examples, processing circuitry (such as a central processing unit and a graphics processing unit), memory circuits, circuit boards, an audio component (or components), a microphone (or microphones), a battery, and flexible circuitry that connects together the aforementioned components. The electronic device 700 may include one or more fan assemblies, such as a fan assembly 710a, a fan assembly 710b, and a fan assembly 710c. The fan assemblies may receive ambient air through openings 708a in the housing 706, and may expel air through openings 708b in the housing 706. Each of the fan assemblies may include any features, including fan motors and its components, described herein for a fan assembly.

Figure 13:
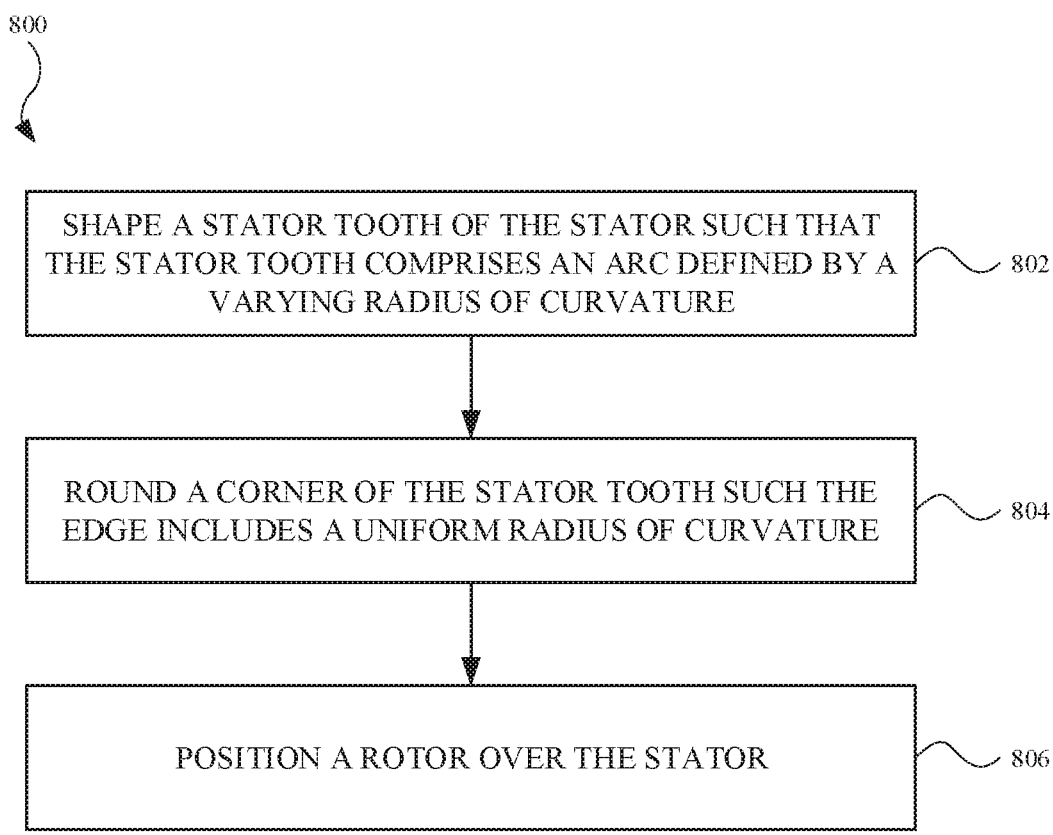
FIG. 13 illustrates a flowchart showing a method for reducing acoustical noise generated by a fan assembly, in accordance with some described embodiments.

FIG. 13 illustrates a flowchart 800 showing a method for reducing acoustical noise generated by a fan assembly, in accordance with some described embodiments. The flowchart 800 shows and described provide a method in which the steps of the method may be carried out to create fan motors described herein.

In step 802, a stator tooth of the stator is shaped such that the stator tooth includes an arc defined by a varying radius of curvature. The varying radius of curvature may include a radius that varies in proportion to a sinusoidal curve. Also, each additional stator tooth of the stator may include a radius that varies in proportion to a sinusoidal curve. It should be noted that the radius can vary in proportion to a cosine curve, as the cosine of an angle θ is equal to the sine of 90 degrees minus the angle θ, i.e., cosine=sine (θ−90°).

In step 804, a corner of the stator tooth is rounded such that the corner includes a uniform radius of curvature. Accordingly, unlike the arc, the corner is defined by a radius that is constant. It should be noted that an additional corner of the stator tooth can be rounded such that the corner includes a uniform radius of curvature. Further, the additional corner may include a radius of curvature defined by the same radius as that of the aforementioned corner.

In step 806, a rotor is positioned over the stator. The rotor may include a magnet that faces the stator. When wires are wound around the stator tooth (and additional stator teeth), the wires can receive an electrical current used to form an electromagnet that interacts with the magnet of the rotor and provides torque to rotationally drive the rotor. When fan blades are connected to the rotor, the fan blades rotate in accordance with the rotor, and the fan blades drive air.

The flowchart 800 provides a method in which the design modifications to the stator can lead to vibration of the fan motor, or a fan assembly that integrates the fan motor. As a result, the acoustical noise emanating from the fan motor can be reduced.

Figure 14:
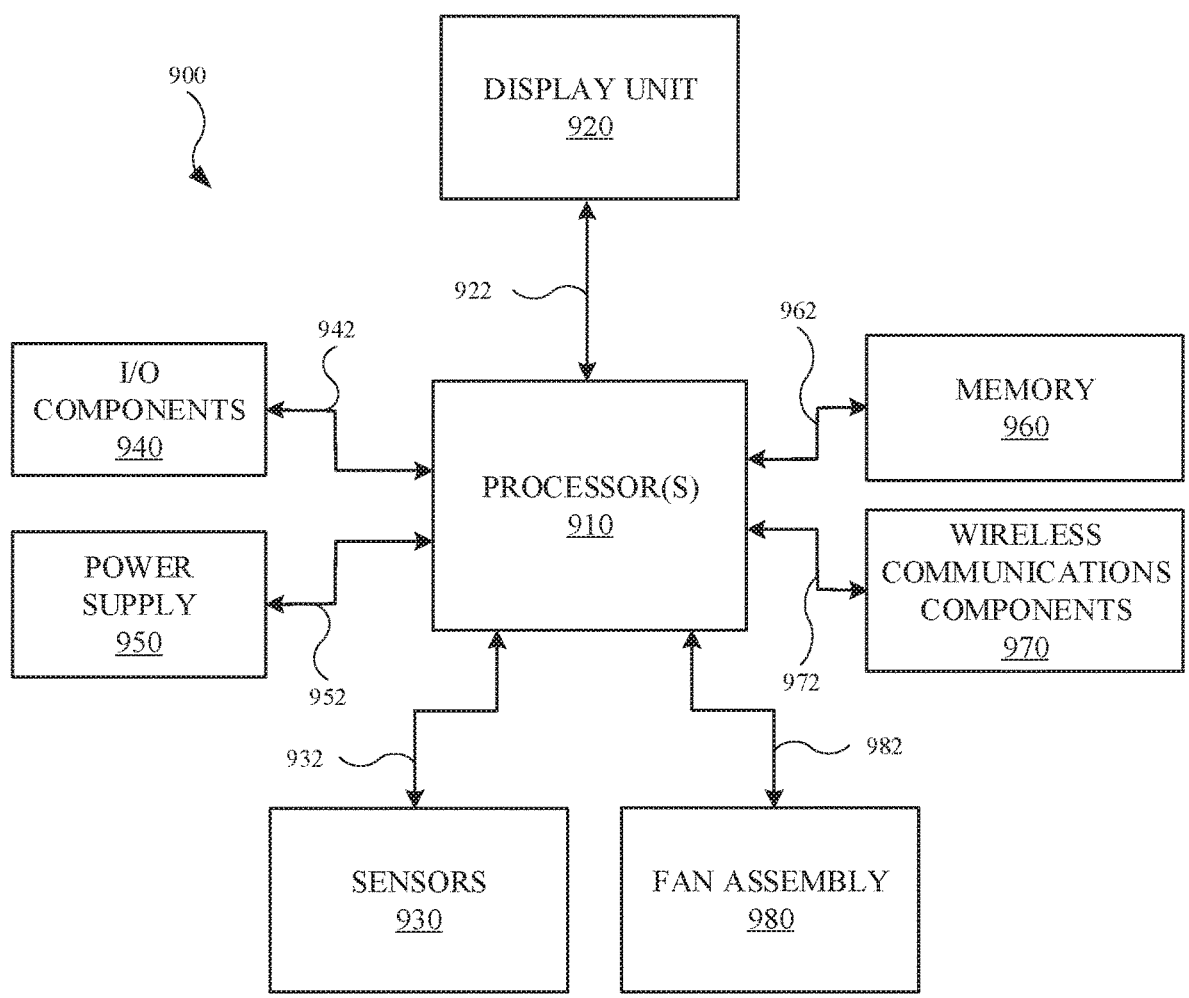
FIG. 14 illustrates a block diagram of an electronic device, in accordance with some described embodiments.

FIG. 14 illustrates a block diagram of an electronic device 900, in accordance with some described embodiments. The features in the electronic device 900 may be present in other electronic devices described herein. The electronic device 900 may include one or more processors 910 for executing functions of the electronic device 900. The one or more processors 910 can refer to at least one of a central processing unit (CPU) and at least one microcontroller for performing dedicated functions. Also, the one or more processors 910 can refer to application specific integrated circuits, or ASICs.

According to some embodiments, the electronic device 900 can optionally include a display unit 920. The display unit 920 is capable of presenting a user interface that includes icons (representing software applications), textual images, and/or motion images. In some examples, each icon can be associated with a respective function that can be executed by the one or more processors 910. In some cases, the display unit 920 includes a display layer (not illustrated), which can include a liquid-crystal display (LCD) or a light-emitting diode display (LED), as non-limiting examples. According to some embodiments, the display unit 920 includes a touch input detection component and/or a force detection component that can be configured to detect changes in an electrical parameter (e.g., electrical capacitance value) when the user's appendage (acting as a capacitor) comes into proximity with the display unit 920 (or in contact with a transparent layer that covers the display unit 920). The display unit 920 is connected to the one or more processors 910 via one or more connection cables 922.

According to some embodiments, the electronic device 900 can include one or more sensors 930 capable of provide an input to the one or more processors 910 of the electronic device 900. The one or more sensors 930 may include a temperature sensor, as a non-limiting example. The one or more sensors 930 is/are connected to the one or more processors 910 via one or more connection cables 932.

According to some embodiments, the electronic device 900 can include one or more input/output components 940. In some cases, the one or more input/output components 940 can refer to a button or a switch that is capable of actuation by the user. When the one or more input/output components 940 are used, the one or more input/output components 940 can generate an electrical signal that is provided to the one or more processors 910 via one or more connection cables 942.

According to some embodiments, the electronic device 900 can include a power supply 950 that is capable of providing energy to the operational components of the electronic device 900. In some examples, the power supply 950 can refer to a rechargeable battery. The power supply 950 can be connected to the one or more processors 910 via one or more connection cables 952. The power supply 950 can be directly connected to other devices of the electronic device 900, such as the one or more input/output components 940. In some examples, the electronic device 900 can receive power from another power source (e.g., an external charging device) not shown in FIG. 14.

According to some embodiments, the electronic device 900 can include memory 960, which can include a single disk or multiple disks (e.g., hard drives), and includes a storage management module that manages one or more partitions within the memory 960. In some cases, the memory 960 can include flash memory, semiconductor (solid state) memory or the like. The memory 960 can also include a Random Access Memory ("RAM") and a Read-Only Memory ("ROM"). The ROM can store programs, utilities or processes to be executed in a non-volatile manner. The RAM can provide volatile data storage, and stores instructions related to the operation of the electronic device 900. In some embodiments, the memory 960 refers to a non-transitory computer readable medium. The one or more processors 910 can also be used to execute software applications stored on the memory 960. In some embodiments, a data bus 962 can facilitate data transfer between the memory 960 and the one or more processors 910.

According to some embodiments, the electronic device 900 can include wireless communications components 970. A network/bus interface 972 can couple the wireless communications components 970 to the one or more processors 910. The wireless communications components 970 can communicate with other electronic devices via any number of wireless communication protocols, including at least one of a global network (e.g., the Internet), a wide area network, a local area network, or a wireless personal area network (WPAN), as non-limiting examples. In some examples, the wireless communications components 970 can communicate using NFC protocol, BLUETOOTH® protocol, or WIFI® protocol.

According to some embodiments, the electronic device 900 can include a fan assembly 980. The fan assembly 980 is designed to remove heat from one or more heat-generating components of the electronic device 900, such as the one or more processors 910. The fan assembly 980 may include modifications, such as a stator that includes stator teeth, with each stator tooth having an arc defined by a varying radius of curvature. Additionally, each stator tooth may include rounded corners defined by a uniform radius of curvature. The fan assembly 980 can connect to the one or more processors 910 by a flexible circuit 982.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
    a housing that defines an interior volume; and
    a fan motor located in the interior volume, the fan motor comprising:
        a stator comprising a stator tooth, the stator tooth comprising:
            a first corner,
            a second corner, and
            an arc located between the first corner and the second corner, the arc comprising an edge defining a varying radius of curvature measured from a common reference to a plurality of points at the edge.

2. The electronic device of claim 1, wherein the fan motor further comprises:
    a rotor that includes a shaft that is positioned in an opening of the stator;
    fan blades connected to the rotor; and
    a magnet carried by the rotor, wherein an electromagnetic field from the stator tooth magnetically repels the magnet, thereby causing rotation of the fan blades and the shaft.

3. The electronic device of claim 1, wherein the varying radius of curvature defines:
    a first radius having first length,
    a second radius having a second length different from the first length, and
    a third radius having a third length different from the first length and the second length.

4. The electronic device of claim 1, wherein:
    the first corner comprises a first rounded corner,
    the second corner comprises a second rounded corner, and
    each of the first rounded corner and the second rounded corner include a uniform radius of curvature.

5. The electronic device of claim 4, wherein the first rounded corner comprises a first radius of curvature, and wherein the second rounded corner comprises a second radius of curvature.

6. The electronic device of claim 5, wherein:
    the first radius of curvature is defined by a first radius, and
    the second radius of curvature is defined by a second radius that is equal to the first radius.

7. The electronic device of claim 1, further comprising a display coupled with the housing.

8. An electronic device, comprising:
    a housing that defines an interior volume; and
    a fan assembly located in the interior volume, the fan assembly comprising:
        fan blades, and
        a fan motor comprising:
            a stator comprising a stator tooth having an arc comprising an edge defined by a varying radius of curvature measured from a common reference to a plurality of points at the edge,
            a rotor, wherein the fan blades are configured to rotate in accordance with the rotor, and
            a magnetic ring carried by the rotor, wherein a separation between the stator tooth and the magnetic ring varies based upon the varying radius of curvature.

9. The electronic device of claim 8, wherein the varying radius of curvature is proportional to a sinusoidal curve.

10. The electronic device of claim 8, wherein the stator tooth further comprises:
    a first rounded corner,
    a second rounded corner wherein each of the first rounded corner and the second rounded corner include a uniform radius of curvature.

11. The electronic device of claim 10, wherein the arc defines a midpoint, and wherein the arc comprises a maximum radius at the midpoint.

12. The electronic device of claim 10, wherein:
    the first rounded corner is defined by a first radius, and
    the second rounded corner is defined by a second radius that is equal to the first radius.

13. The electronic device of claim 8, wherein the rotor comprises a shaft positioned in an opening of the stator.

14. The electronic device of claim 13, wherein the rotor and the magnetic ring surround the stator.

15. The electronic device of claim 8, wherein the stator further comprises:
    a first corner; and
    a second corner, wherein the arc is located between the first corner and the second corner.

16. An electronic device, comprising:
a housing that defines an interior volume;
a fan motor located in the interior volume;
a stator having a stator tooth, the stator tooth comprising:
   an arc defining a varying radius of curvature; and
   a rounded corner that includes a uniform radius of curvature;
a rotor positioned over the stator; and
a magnet extending from the rotor and facing the stator, wherein based on the varying radius of curvature:
   a first radius from a reference point to a first location on the arc comprises a first length, and
   a second radius from the reference point to a second location on the arc comprises a second length different from the first length, wherein the second location is different from the first location.

17. The electronic device of claim 16, wherein the varying radius of curvature is proportional to a sinusoidal curve.

18. The electronic device of claim 16, wherein based further on the varying radius of curvature:
   a third radius from the reference point to a third location on the arc comprises a third length different from the first length and the second length, wherein the third location is different from the first location and the second location.

19. The electronic device of claim 16, wherein:
the uniform radius of curvature is a first uniform radius of curvature; and
the stator tooth comprises a second rounded corner having a second uniform radius of curvature.

20. The electronic device of claim 19, wherein:
the first uniform radius of curvature is defined by the first radius, and
the second uniform radius of curvature is defined by the second radius that is approximately equal to the first radius.

* * * * *